United States Patent
Ghoshal et al.

(10) Patent No.: US 10,373,211 B1
(45) Date of Patent: Aug. 6, 2019

(54) DEVICE AND METHOD FOR PRESENTING TAILORED ADVERTISEMENT CONTENT FOR MULTIPLE PLATFORMS

(71) Applicant: Sprint Communications Company L.P., Overland Park, KS (US)

(72) Inventors: Jagannath Ghoshal, Overland Park, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 690 days.

(21) Appl. No.: 14/198,586

(22) Filed: Mar. 5, 2014

(51) Int. Cl.
*G06Q 30/02* (2012.01)

(52) U.S. Cl.
CPC ................. *G06Q 30/0276* (2013.01)

(58) Field of Classification Search
CPC ............... G06Q 30/02; G06F 3/04842
USPC ........................... 705/14.52, 14.64
See application file for complete search history.

(56) References Cited

U.S. PATENT DOCUMENTS

| | | | | |
|---|---|---|---|---|
| 2006/0178934 A1* | 8/2006 | Besmertnik | ......... | G06Q 30/02 705/14.6 |
| 2007/0100688 A1* | 5/2007 | Book | .................. | G06Q 30/02 705/14.52 |
| 2010/0091677 A1* | 4/2010 | Griff | ................... | H04L 41/12 370/252 |
| 2014/0012676 A1* | 1/2014 | Forte | .................. | G06Q 30/02 705/14.64 |

* cited by examiner

*Primary Examiner* — John Van Bramer
*Assistant Examiner* — Darnell A Pouncil

(57) ABSTRACT

Embodiments of the disclosure are directed to methods and systems for providing brand specific content and advertising content for use on a mobile device. A mobile device may comprise an operating system component operable to regulate the presentation of advertisement content on a mobile device. The operating system component may receive a template for the advertisement spaces on a device from a branding component. Then, the operating system component may request and receive advertisement content from an outside source. The mobile device may be compatible with multiple brands, and if the brand association is changed, the branding component may build a new template that reflects the updates.

15 Claims, 7 Drawing Sheets

DEVICE AND METHOD FOR PRESENTING TAILORED ADVERTISEMENT CONTENT FOR MULTIPLE PLATFORMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising content may be presented to users of mobile communication devices when the users employ functions of the device such as internet access, gaming, or other sponsored applications. Devices capable of displaying this sort of advertising content may include mobile phones, portable digital assistants, tablets, and laptop computers. The advertising content may include videos, still images, links to offers or discounts at a particular vendor, or to a chain or subsidiary of a particular vendor. The advertisements may vary based on the type and size of the advertisement that can be inserted into the content.

SUMMARY

In an embodiment, a method for presenting advertisements on a mobile communication device is disclosed. The method comprises: changing the brand associated with the mobile device; updating advertisement space information for the device based on the new brand information; and building a template to define available advertisement spaces based on the updated advertisement space information. The template comprises details of allowed ad spaces, allowed ad sizes, and content restrictions. The method further comprises identifying available advertisement spaces on the device based on the allowed spaces defined by the template; requesting advertisement content from an ad gateway in communication with the mobile device; receiving advertisement content from the ad gateway; and placing the advertisement content into one or more of the identified advertisement spaces on the device.

In an embodiment, a mobile communication device is disclosed. The mobile device comprises an operating system, a user interface, one or more advertisement spaces within the user interface, a branding component, and an operating system component. The branding component executed by the operating system is operable to: change the brand associated with the mobile device, update advertisement space information for the device based on the new brand information, and build a template to define available advertisement spaces based on the updated advertisement space information. The template comprises details of allowed ad spaces, allowed ad sizes, and content restrictions. The operating system component executed by the operating system is operable to identify available advertisement spaces on the device based on the allowed ad spaces defined by the template, to request advertisement content from an ad gateway in communication with the mobile device, to receive advertisement content from the ad gateway, and to place the advertisement content into one or more or the identified advertisement spaces on the device based on the template.

In an embodiment, a method for improving the advertisement experience on a mobile communication device is disclosed. The method comprises: identifying available advertisement spaces on the device, wherein the advertisement spaces are built into a user interface on the mobile communication device; requesting advertisement content from an ad gateway in communication with the mobile device; receiving advertisement content from the ad gateway; examining the advertisement content for compatibility with the available advertisement spaces; and placing the advertisement content into one or more of the advertisement spaces on the device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
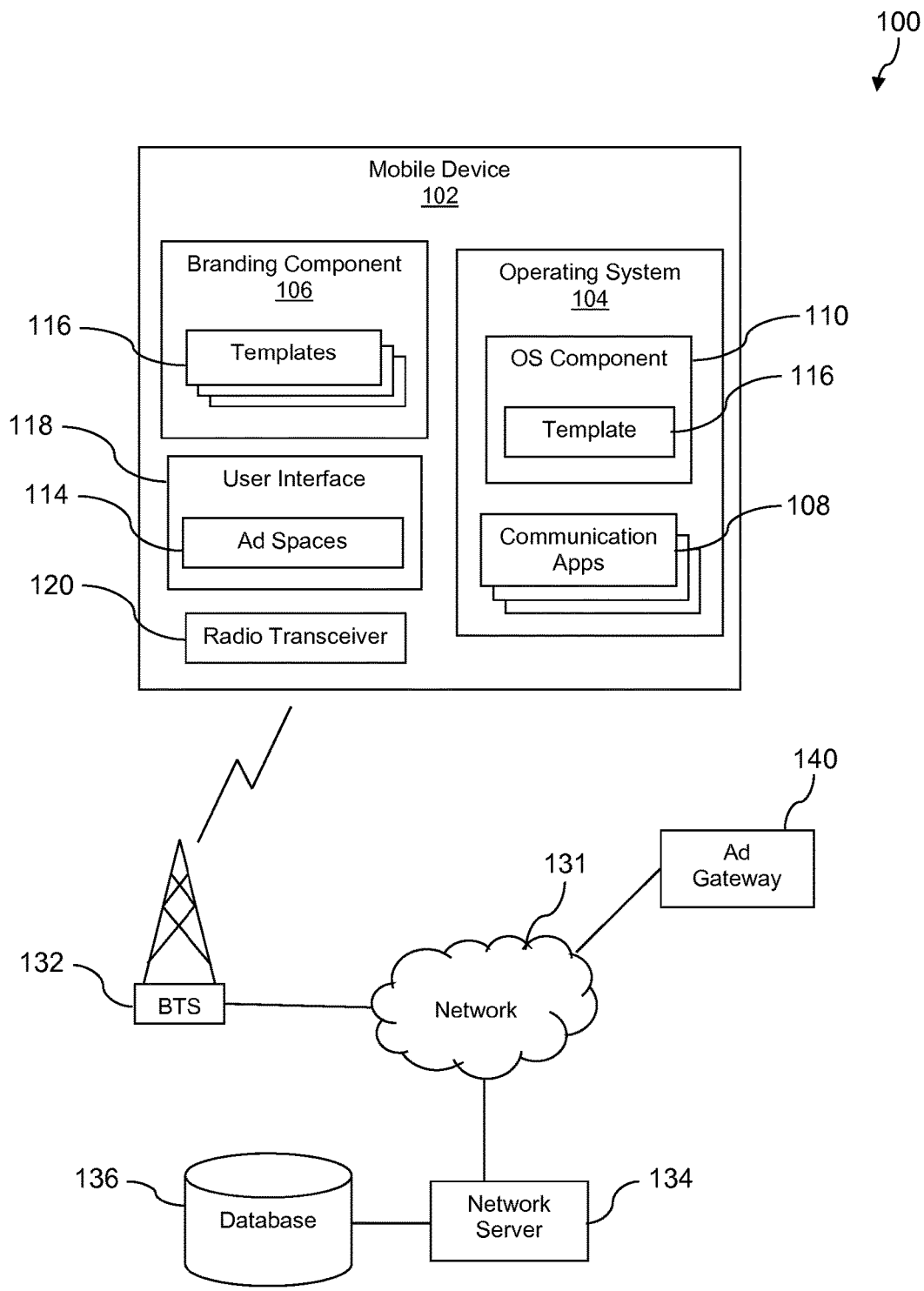
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for providing brand specific content and advertising content for use on a mobile communication device. The user interface of a mobile communication device may comprise advertisement spaces that are available for presenting advertisement content. The constraints for the advertisement spaces may vary based on the device type and the brand associated with the device. For example, a first brand or device may have strict restrictions on what can be advertised on a device, excluding content such as advertisement of alcoholic beverages, sexually suggestive advertisements, political advertisements, etc., while a second brand or device may have less or no restrictions for advertisement content. Additionally, a brand or device may have limitations on the size, location, or frequency of the advertisement content that may be shown on the mobile device.

A branding component in communication with the device (or possibly stored on the device) may be operable to build a template for a particular device and brand associated with that device, where the template outlines the available advertisement space on a device. The template may include information such as brand information, device information, existing ad spaces on the device, details of the ad spaces, size of the ad spaces, format of the ad spaces, and policies or restrictions for the brand and/or device concerning advertisements. The template may define and/or contain details about allowed ad spaces, allowed ad sizes, and content restrictions. The template may be used by an operating system component on the device to request and receive advertisement content from an outside source, such as an ad gateway. Additionally, the operating system component may be operable to examine the content for adherence to the template and then place the advertisement content into the available ad spaces on the device.

In some cases, the mobile device may be compatible with multiple branding options, and during the lifetime of the device, the brand assigned to the device may be changed. If the brand assignment and/or association for a device are changed, the branding component may build a new template based on the new brand information, and possibly based on other updated information for the device. New brand information may comprise different policies on how advertisement spaces may be used. For example, one brand may allow access for advertisements to a certain space on the display of the device, while another brand may not allow advertisements, or may restrict the type and/or size of advertisements, in that space. The operating system component may then use the updated template to request and receive new advertisement content from the ad gateway. The ability to update the template for a device may provide a simple way to update the way advertisements are handled on a particular device, without completely resetting a device. Additionally, throughout the use-life of the device, the advertisement content received from the ad gateway may be periodically updated by communication between the ad gateway and the operating system component on the device.

Turning now to FIG. 1, a communication system 100 is described. In an embodiment, the communication system 100 comprises a mobile device 102 comprising a cellular radio transceiver 120, an operating system 104, a user interface 118 and a plurality of communication applications 108 executed by the operating system 104. The mobile device 102 may engage in a variety of communication exchanges. The mobile device 102 may be a mobile phone, a personal digital assistant (PDA), a media player, a laptop computer, a tablet computer, or another electronic device having a cellular radio transceiver.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile device 102 may couple to the network 131 by a variety of communication paths. The mobile device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. In some embodiments, the mobile device 102 may communicate with the base transceiver station (BTS) 132 via the cellular radio transceiver 120 of the mobile device 102. The wireless link between the mobile device 102 and the base transceiver station 132 may couple the mobile device 102 to the network 131. Additionally, the base transceiver station 132 may also be known as a cell tower.

It is understood that the system 100 may comprise any number of mobile devices 102 and any number of base transceiver stations 132. The collectivity of base transceiver stations 132 may be said to comprise a radio access network, in that these base transceiver stations 132 may provide radio communication links to the mobile devices 102 to provide access to the network 131. The radio access network may be abstracted in different ways and may comprise, in addition to the base transceiver stations 132, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile devices 102.

The communication applications 108 may comprise a voice communication application, a data communication application, a web browser application, an email application, a short message system (SMS) or texting application, a multimedia message system (MMS) application, and/or other communication applications. The communication applications 108 may be standard communication applications that are delivered by an original equipment manufacturer (OEM) who assembles the mobile device 102. The communication applications 108 may be stored as firmware or software in a memory of the mobile device 102. The communication applications 108 may expose application programming interfaces (APIs) accessible to other applications to provide wireless communication functionality to the other applications.

One of the communication applications 108 may be a telephone application that receives dialed digits and attempts to originate a voice call—for example a voice over IP (VoIP) call—to a called telephone. One of the communication applications 108 may be a web browser application that requests content from the network 131, for example by sending out a hypertext transport protocol (HTTP) message embedding a universal reference locator (URL). One of the communication applications 108 may be a media player that requests streaming or downloading media from the network 131. Many of the communication applications 108 may depend upon communication service provided by an IMS network to deliver their functionality to an end user of the mobile device 102. One of the communication applications 108 may comprise a mobile transaction interface, where a user may complete a purchase using the application, and secure information, such as credit card information, may be communicated through the application. In some embodiments, the communication applications 108 may be stored in a system memory partition of the memory of the mobile device 102.

The user interface 118 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, ring tones or phone call audio) to a user of the mobile device 102. The microphone may receive voice and/or audio from a user and/or communicate audio to a user. In an embodiment, a user may utilize the user interface 118 to communicate with the mobile device 102, for example, to initiate the execution of one or more of the communication applications 108. Additionally, a user may receive communication from the mobile device 102 via the user interface 118, such as phone calls, text messages, messages, emails, contact information, caller identification, call history, internet access, etc. A user may additionally employ the user interface 118 for viewing and/or listening to media such as music, movies, shows, videos, photos, games etc. Additionally, the user interface 118 may comprise advertisement spaces 114 that may be operable to present advertisement data or content to a user via portions of the user interface 118.

In some embodiments, the mobile device 102 may comprise a branding component 106 which may be operable to access brand information associated with the mobile device 102, as well as device information. This information may include the existing advertisement spaces 114 within the user interface 118 and which advertisement spaces 114 are allowed to be accessed. Additionally, details of the advertisement spaces 114, such as size, format, duration, etc., may be known by the branding component 106. Other policies and restrictions associated with (or imposed by) the brand or device information may also be known by the branding component 106. For example, some brands and/or devices may have content restrictions for advertisements, such as ads for alcohol, suggestive content, political content, etc. while other brands may have different restrictions. Additionally, some brands and/or devices may have restrictions on the size, number, location and/or frequency of advertisements shown on the device, and these restrictions may vary between brands and/or devices.

In some embodiments, the branding component 106 may be operable to build one or more templates 116 based on the brand and device information, wherein the template(s) 116 may be used to choose advertisement content to be used in the advertisement spaces 114. In some embodiments, the templates 116 may be built from a master template, wherein all subsequent templates 116 comprise a portion of the master template. For example, the master template may comprise all possible advertising space information, but based on restrictions or policies, only portions of the master template may be chosen to form a sub-template that may be used for a particular device associated with a particular brand.

In some embodiments, the branding component 106 may be stored and executed on the mobile device 102, while in other embodiments, the branding component 106 may be separate from the mobile device 102, such as on a network server 134 or database 136. In either case, the branding component 106 may communicate the template(s) 116 generated for the mobile device 102 to an operating system component 110 on the mobile device 102.

In some embodiments, the mobile device 102 may comprise an operating system (OS) component 110 executed by the operating system (OS) 104 of the mobile device 102. The OS component 110 may be operable to identify advertisement spaces 114 that are available using one or more of the template(s) 116 generated by the branding component 106. In some embodiments, the OS component 110 may send a request for advertisement content to an ad gateway 140 to fill the advertisement spaces 114. In some embodiments, the request may comprise information about the constraints for the ad spaces contained in the template 116. For example, the template 116 information may be communicated to the ad gateway 140 as a part of the request for advertisement content.

The OS component 110 may also receive the advertisement content from the ad gateway 140 and verify that the advertisement content complies with the template 116 for the mobile device 102 and brand of the mobile device 102. The communication between the ad gateway 140 and the OS component 104 may be continuous or periodic over the use-life of the mobile device 102, wherein the advertisement content received by the OS component 110 from the ad gateway 140 may be updated or changed on a regular basis. In some embodiments, the OS component 110 may also be operable to place the advertisement content in the advertisement spaces 114.

In some embodiments, the mobile device 102 may communicate with the ad gateway 140 via the network 131, wherein the advertisement content may be communicated to the mobile device 102 from the ad gateway 140 over the network 131. The ad gateway 140 may, in some embodiments, comprise a system for targeting ads to consumers. In some embodiments, the ad gateway 140 may control the placement of the advertisement content into the advertisement spaces 114. For example, the OS component 110 may yield temporary control to the ad gateway 140, wherein the ad gateway 140 may then have access to the advertisement spaces 114 available on the mobile device 102.

Figure 2:
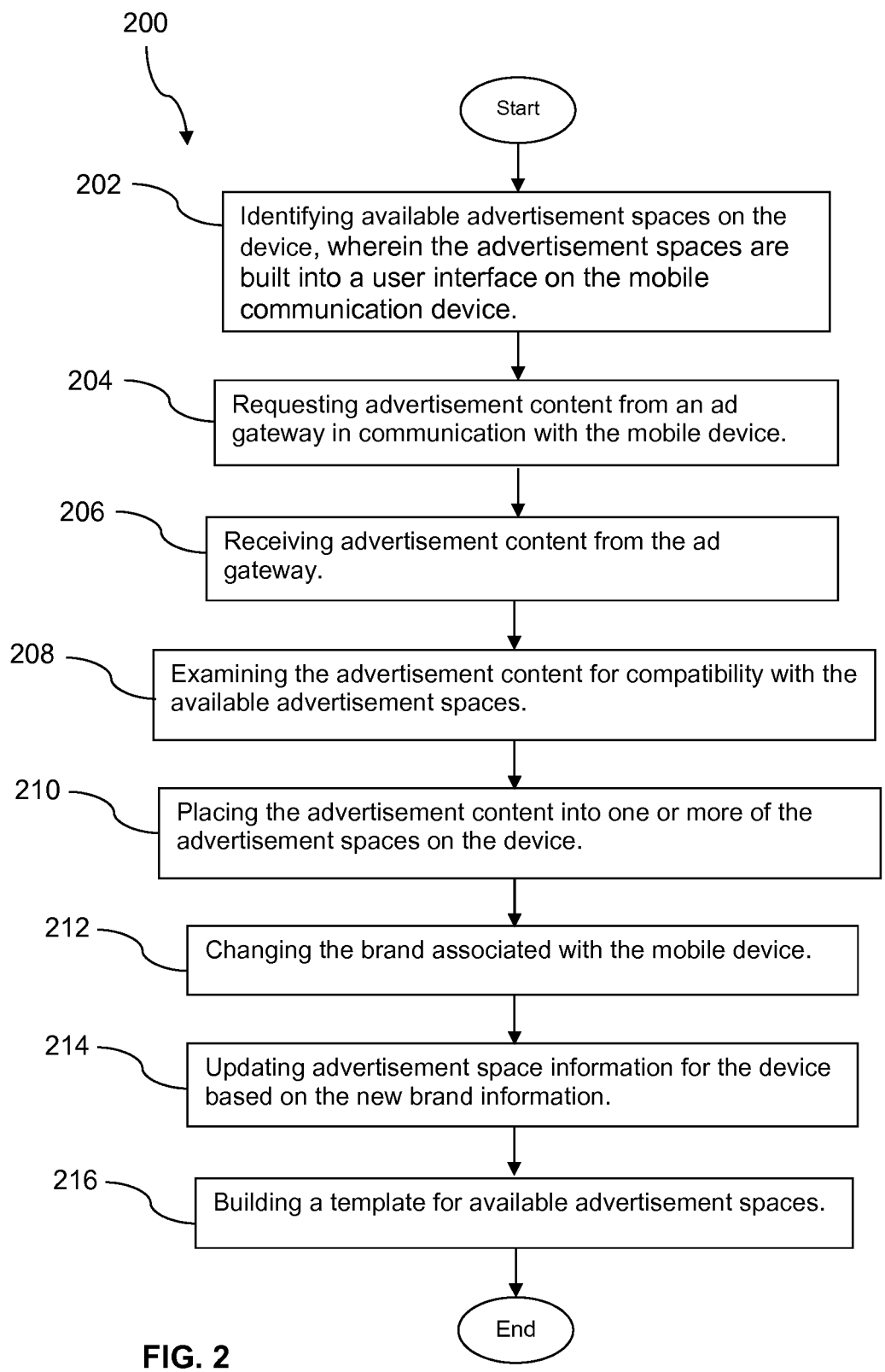
FIG. 2 is a flow chart illustrating a method according to an embodiment of the disclosure.

Turning now to FIG. 2, a method 200 for improving the advertisement experience on a mobile communication device is described. At block 202, available advertisement spaces on the device are identified, wherein the advertisement spaces may be built into a user interface on the mobile communication device. Identification of advertisement spaces on the device may be based on advertisement space information and advertisement placement policy information received from a brand component of the mobile communication device. The advertisement information may comprise brand information, device information, identification of existing ad spaces on the device, identification of allowed ad spaces on the device, definition of size of the allowed ad spaces and other information. At block 204, advertisement content is requested from an ad gateway in communication with the mobile device, wherein the advertisement content is selected for the available advertisement spaces. At block 206, advertisement content is received from the ad gateway. At block 208, the advertisement content is examined for compatibility with the available advertisement spaces. The examination may be based on a template and/or a policy that may be specific to a brand of the mobile device. For example, a template or policy associated with a first brand may authorize placement of ads of any kind while a template or policy associated with a second brand may block placement of ads of a certain kind, for example ads about alcoholic beverages or about violent movies.

If the advertisement content received from the ad gateway is determined at block 208 to be compatible with the available advertisement spaces and the advertisement placement policy information, at block 210 the advertisement content is placed into one or more of the advertisement spaces on the device. If the advertisement content is not determined to be compatible with the available advertisement spaces and the advertisement placement policy information, the advertisement content may be discarded and no advertisement may be placed on the device and/or presented in a display of the device. In an embodiment, another ad may be requested from the ad gateway and again examined as described above with reference to block 208. If this second advertisement content received from the ad gateway is determined to be compatible with the available advertisement spaces and the advertisement placement policy information, the advertisement content is placed into one or more of the advertisement spaces on the device and/or displayed in the one or more advertisement spaces on the display of the device.

In some embodiments, at block 212, the brand associated with the mobile device may be changed. Then, in some embodiments, at block 214, the advertisement space information may be updated for the device based on the new brand information. In some embodiments, at block 216, or optionally earlier in the method 200, a template may be built that identifies the available advertisement spaces.

In some embodiments, at least a portion of the method may be completed by an operating system component on the device. In some embodiments, identifying available advertisement spaces may comprise receiving ad space information and policy information from a brand component on the device. In some embodiments, ad space information may be updated periodically by the brand component. In some embodiments, building the template may comprise selecting at least a portion of a master template. In some embodiments, advertisement space information may comprise: brand information, device information, existing ad spaces on the device, details of the ad spaces, size of the ad spaces, format of the ad spaces, and policies for the brand and/or device concerning advertisements. In some embodiments, placing the ad content in ad spaces comprises allowing the ad gateway to access the ad spaces. In some embodiments, the method 200 may further comprise periodically updating the advertisement content displayed by the advertisement spaces.

Figure 3:
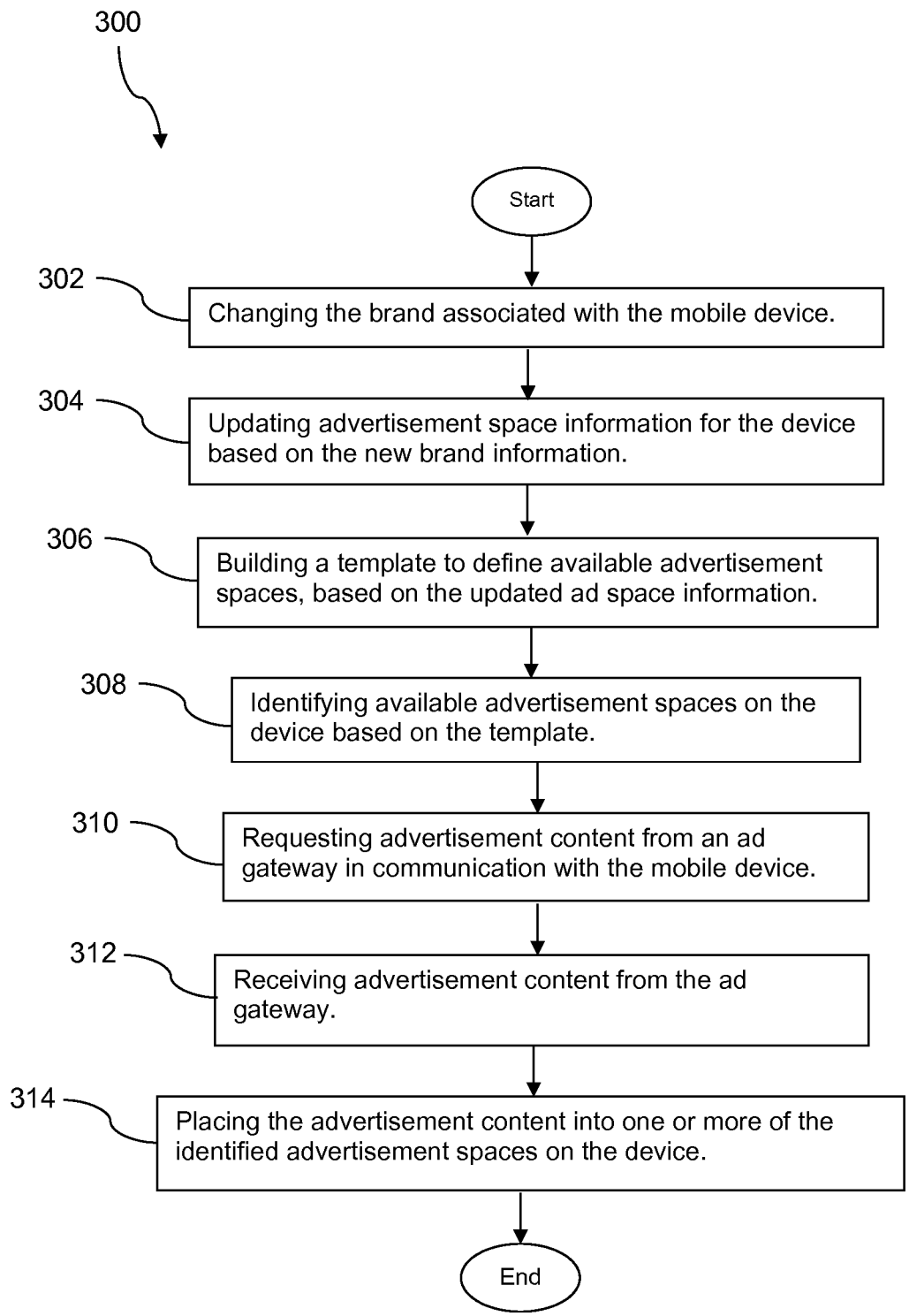
FIG. 3 is a flow chart illustrating another method according to an embodiment of the disclosure.

Turning now to FIG. 3, a method 300 for presenting advertisements on a mobile communication device is described. At block 302, the brand associated with the mobile device is changed. At block 304, advertisement space information for the device is updated based on the new brand information. Then at block 306, a template is built to define the available ad spaces on the device that may be used to display advertisement content based on the updated brand information and policy information. In an embodiment, the template comprises details of allowed ad spaces, allowed ad sizes, and content restrictions At block 308, available advertisement spaces on the device are identified based on the allowed ad spaces defined by the template. At block 310, advertisement content is requested from an ad gateway in communication with the mobile device. At block 312, advertisement content is received from the ad gateway. Then, at block 314, the advertisement content is placed into one or more of the identified advertisement spaces on the device.

In some embodiments, the steps of changing 302, updating 304, and building 306 are completed by a branding component on the mobile device. In some embodiments, the steps of changing 302, updating 304, and building 306 are completed by a branding component in communication with the mobile device. In some embodiments, the steps of identifying 308, requesting 310, receiving 312, and placing 314 are completed by an operating system component on the mobile device. In some embodiments, placing the ad content in ad spaces comprises allowing the ad gateway to access the ad spaces. In some embodiments, the template comprises details of the ad spaces, size of the ad spaces, and format of the ad spaces. In some embodiments, the method 300 further comprises periodically updating the advertisement content displayed in the advertisement spaces.

Figure 4:
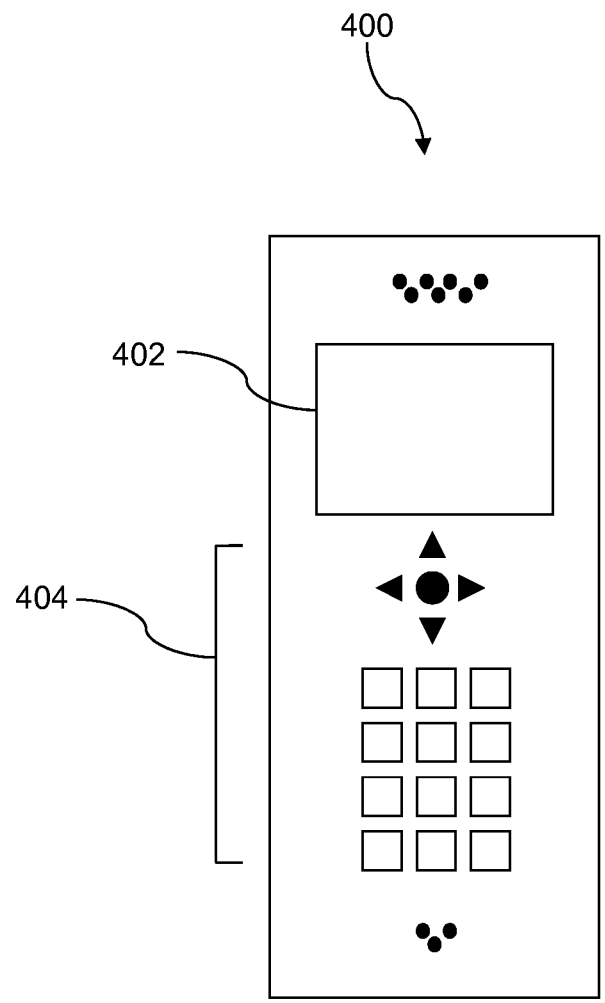
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
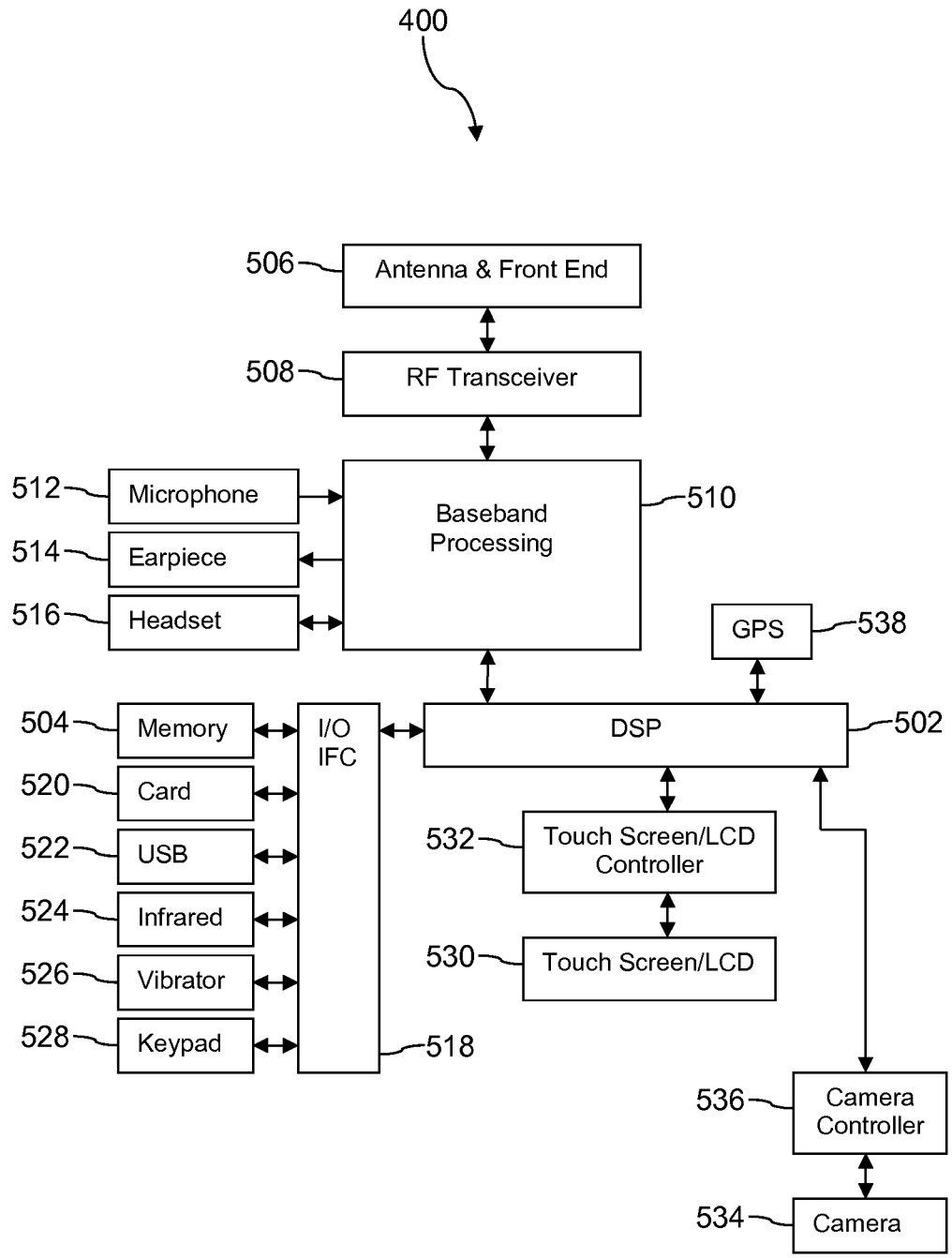
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
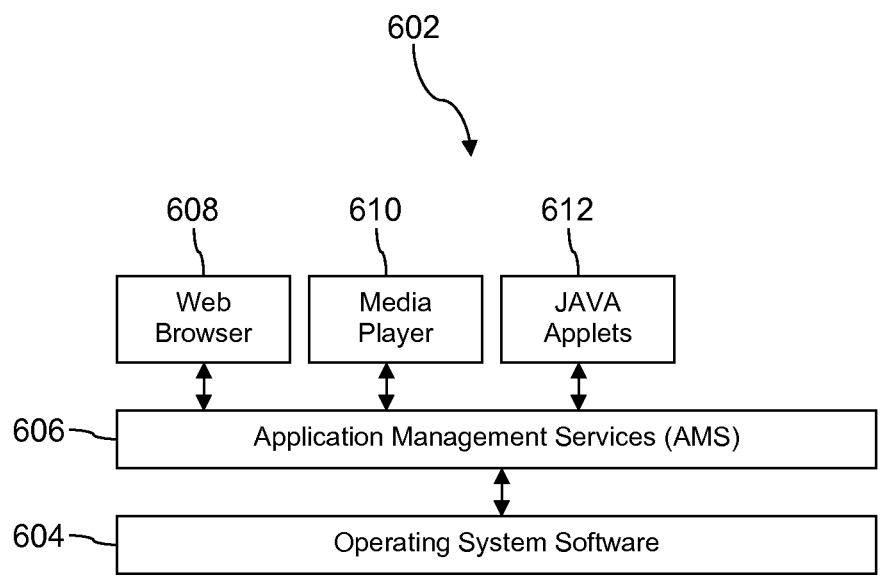
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
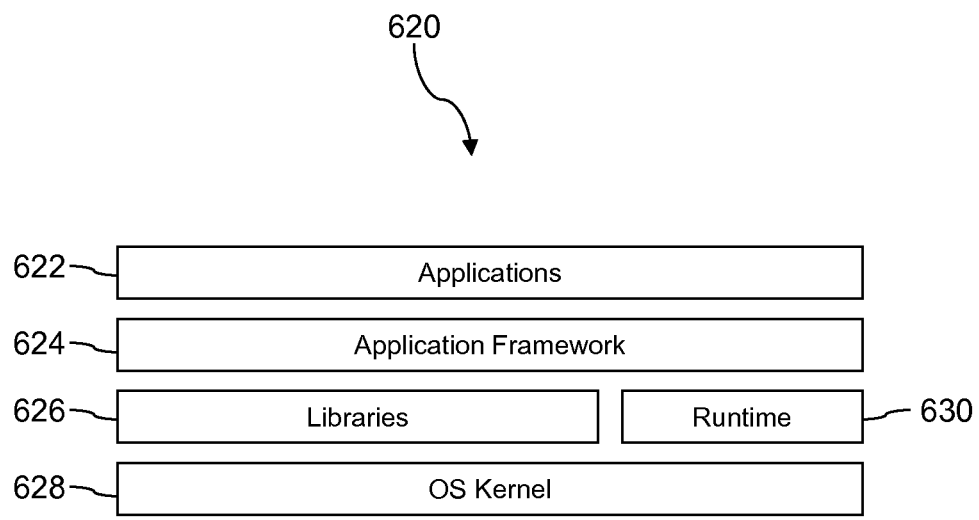
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
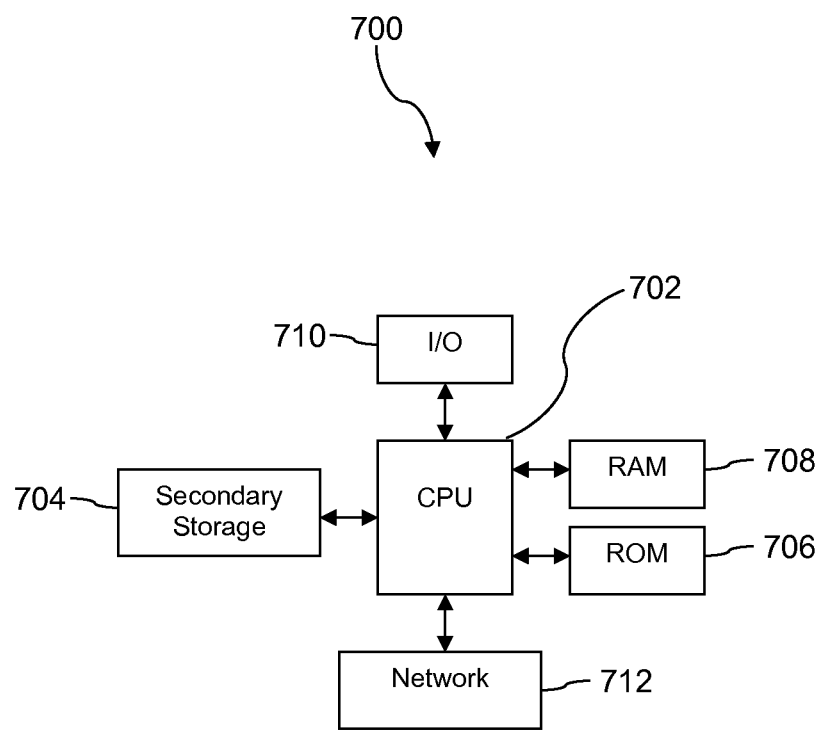
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for presenting advertisements on a mobile communication device comprising:
changing, by a branding component stored in a non-transitory memory of the mobile communication device and executed by a processor of the mobile communication device, a brand of the mobile communication device, wherein changing the brand of the mobile communication device comprises reconfiguring how the mobile communication device handles content presentation on the mobile communication device without completely resetting the mobile communication device by generating a template specific to the changed brand of the mobile communication device configured to control allowed location of content presentation, allowed size of presented content, and allowed subject matter of presented content;
updating, by the branding component, advertisement space information for the mobile communication device based on brand information associated with the changed brand of the mobile communication device;
generating, by the branding component, the template specific to the changed brand of the mobile communication device to define available advertisement spaces based on the updated advertisement space information, wherein the template comprises details of the allowed location of content presentation, the allowed size of presented content, and the allowed subject matter of presented content for the changed brand of the mobile communication device, and wherein the template enables a change in how advertisements are handled on the mobile communication device for the changed brand without completely resetting the mobile communication device;
identifying, by an operating system component stored in a non-transitory memory of the mobile communication device and executed by a processor of the mobile communication device, available advertisement spaces on the mobile communication device based on the allowed advertisement spaces defined by the template;
requesting, by the operating system component, advertisement content from an external ad gateway in communication with the mobile communication device;
in response to the requesting, receiving, by the operating system component, advertisement content from the external ad gateway;
verifying, by the operating system component, whether the received advertisement content complies with the template;
in response to verifying that a first advertisement content of the received advertisement content complies with the template, placing, by the operating system component, the first advertisement content into one or more of the identified advertisement spaces on a user interface of the mobile communication device;
in response to verifying that a second advertisement content of the received advertisement does not comply with the template, blocking, by the operating system component, the second advertisement from placement into the one or more of the identified advertisement spaces on the user interface of the mobile communication device; and
displaying, by the mobile communication device, the first advertisement content in the one or more of the identified advertisement spaces on the user interface of the mobile communication device.

2. The method of claim 1, wherein placing the first advertisement content into the one or more of the identified advertisement spaces comprises allowing the ad gateway to access the one or more of the identified advertisement spaces.

3. The method of claim 1, further comprising:
in response to verifying that the second advertisement content does not comply with the template, requesting, by the operating system component, different advertisement content from the external ad gateway.

4. The method of claim 1, further comprising periodically receiving, by the operating system component, updated advertisement content for display in the one or more of the identified advertisement spaces.

5. A mobile communication device comprising:
an operating system of the mobile communication device;
a user interface of the mobile communication device comprising one or more advertisement spaces;
a branding component stored in a non-transitory memory of the mobile communication device and executed by a processor of the mobile communication device to:
change a brand of the mobile communication device, wherein changing the brand of the mobile communication device comprises reconfiguring how the mobile communication device handles content presentation on the mobile communication device without completely resetting the mobile communication device by generating a template specific to the changed brand of the mobile communication device configured to control allowed location of content presentation, allowed size of presented content, and allowed subject matter of presented content,
update advertisement space information for the mobile communication device based on brand information associated with the changed brand of the mobile communication device, and
generate the template specific to the changed brand of the mobile communication device to define available advertisement spaces based on the updated advertisement space information, wherein the template comprises details of the allowed location of content presentation, the allowed size of presented content, and the allowed subject matter of presented content for the changed brand of the mobile communication device, and wherein the template enables a change in how advertisements are handled on the mobile communication device for the changed brand without completely resetting the mobile communication device; and
an operating system component executed by the operating system to:
identify available advertisement spaces on the mobile communication device based on the allowed advertisement spaces defined by the template,
request advertisement content from an external ad gateway in communication with the mobile communication device,
in response to the requesting, receive advertisement content from the external ad gateway, verify whether the received advertisement content complies with the template, in response to verifying that a first advertisement content of the received advertisement content complies with the template, place the first advertisement content into one or more of the identified advertisement spaces on the user interface of the mobile communication device based on the template, wherein the first advertisement content is displayed in the one or more of the identified advertisement spaces on the user interface of the mobile communication device, and in response to verifying that a second advertisement content of the received advertisement content does not comply with the template, block the second advertisement content from placement into the one or more of the identified advertisement spaces on the user interface of the mobile communication device.

6. The mobile communication device of claim 5, wherein placing the first advertisement content into the one or more of the identified advertisement spaces comprises allowing the external ad gateway to the one or more of the identified advertisement spaces.

7. The mobile communication device of claim 5, wherein the operating system component requests different advertisement content in response to verifying that the second advertisement content does not comply with the allowed advertisement sizes defined by the template.

8. The mobile communication device of claim 5, wherein the operation system component requests different advertisement content in response to verifying that the second advertisement content received from the ad gateway does not comply with the content restrictions of the template.

9. A method for improving the advertisement experience on a mobile communication device comprising:

changing, by a branding component stored in a non-transitory memory of the mobile communication device and executed by a processor of the mobile communication device, a brand of the mobile communication device, wherein changing the brand of the mobile communication device comprises reconfiguring how the mobile communication device handles content presentation on the mobile communication device without completely resetting the mobile communication device by generating a template specific to the changed brand of the mobile communication device configured to control allowed location of content presentation, allowed size of presented content, and allowed subject matter of presented content;

updating, by the branding component, advertisement space information for the mobile communication device based on brand information associated with the changed brand of the mobile communication device;

updating, by the branding component, advertisement space information and advertisement placement policy information based on the changed brand of the mobile communication device, wherein the advertisement space information comprises brand information, device information, identification of existing advertisement spaces on the mobile communication device, identification of allowed advertisement spaces on the mobile communication device, and definition of size of the allowed advertisement spaces;

generating, by the branding component, the template specific to the changed brand of the mobile communication device to define available advertisement spaces based on the updated advertisement space information, wherein the template comprises details of the allowed location of content presentation, the allowed size of presented content, and the allowed subject matter of presented content for the changed brand of the mobile communication device, and wherein the template enables a change in how advertisements are handled on the mobile communication device for the changed brand without completely resetting the mobile communication device;

identifying, by an operating system component stored in a non-transitory memory of the mobile communication device and executed by a processor of the mobile communication device, available advertisement spaces on the mobile communication device based on the allowed advertisement spaces defined by the template, wherein the identified advertisement spaces are built into a user interface on the mobile communication device;

requesting, by the operating system component, advertisement content from an external ad gateway in communication with the mobile communication device, wherein the advertisement content is selected for the available advertisement spaces;

in response to the requesting, receiving, by the operating system component, advertisement content from the external ad gateway;

verifying, by the operating system component, whether the received advertisement content complies with the template;

in response to verifying that a first advertisement content of the received advertisement content complies with the template, placing, by the operating system component, the first advertisement content into one or more of the identified advertisement spaces on the user interface of the mobile communication device;

in response to verifying that a second advertisement content of the received advertisement does not comply with the template, blocking, by the operating system component, the second advertisement content from placement into the one or more of the identified advertisement spaces on the user interface of the mobile communication device; and displaying, by the mobile communication device, the first advertisement content in the one or more of the identified advertisement spaces on the user interface of the mobile communication device.

10. The method of claim 9, further comprising:

in response to verifying that the second advertisement does not comply with the template, requesting, by the operating system component, different advertisement content from the external ad gateway.

11. The method of claim 9, wherein the advertisement space information is updated periodically by the branding component.

12. The method of claim 9, wherein building the template comprises selecting at least a portion of a master template.

13. The method of claim 9, wherein the advertisement placement policy comprises definitions of restricted content, where the restricted content is one or more of advertisement content about alcoholic beverages, advertisement content of a sexually suggestive nature, and political advertisement content.

14. The method of claim 9, wherein placing the first advertisement content into the one or more identified advertisement spaces comprises allowing the external ad gateway to access the one or more of the identified advertisement spaces.

15. The method of claim 9, further comprising periodically receiving, by the operating system component, updated advertisement content for display in the one or more of the identified advertisement spaces.

\* \* \* \* \*